United States Patent [19]
Williams

[11] Patent Number: 5,991,818
[45] Date of Patent: Nov. 23, 1999

[54] SYSTEM AND METHOD FOR TRANSFERRING INFORMATION REPRESENTATIVE OF CONDITIONS AT A RECEIVING DEVICE FOR A VIRTUAL CIRCUIT IN A COMPUTER NETWORK

[75] Inventor: James B. Williams, Lowell, Mass.

[73] Assignee: Giga Net, Inc., Concord, Mass.

[21] Appl. No.: 09/067,533

[22] Filed: Apr. 27, 1998

[51] Int. Cl.[6] .................................................. G06F 13/00
[52] U.S. Cl. ........................ 709/250; 709/227; 709/206; 709/249
[58] Field of Search ................................. 709/227, 250, 709/249, 206

[56] References Cited

U.S. PATENT DOCUMENTS

| | | | |
|---|---|---|---|
| 5,708,779 | 1/1998 | Graziano et al. | 709/250 |
| 5,796,944 | 8/1998 | Hill et al. | 709/250 |
| 5,826,269 | 10/1998 | Hussey | 707/10 |

Primary Examiner—Krisna Lim
Attorney, Agent, or Firm—Richard A. Jordan

[57] ABSTRACT

A system comprises a plurality of devices which communicate over a network. At least one of the devices transmits information to at least one other of the devices in information messages over a virtual circuit established therebetween using the network. The other device can transmit information concerning, for example, predetermined conditions in the other device in connection with the virtual circuit using signalling messages, which are transmitted by the other device over the virtual circuit to the one device. The one device includes a plurality of mailboxes associated with the virtual circuit, and the other device, that is, the device that is to transmit signalling messages, includes a transmit signal queue including a plurality of entries each associated with one of the mailboxes. A processor on the other device, to enable transmission of a signalling message including the condition information to be transferred to a mailbox, loads the condition information to be transferred into the transmit signal queue entry associated with the mailbox. The other device, in turn, transmits the signalling message to the one device, which loads the condition information in the appropriate mailbox. A processor on the one device retrieves the condition information from the mailbox to determine the condition information as communicated thereto by the other device.

3 Claims, 3 Drawing Sheets

SYSTEM AND METHOD FOR TRANSFERRING INFORMATION REPRESENTATIVE OF CONDITIONS AT A RECEIVING DEVICE FOR A VIRTUAL CIRCUIT IN A COMPUTER NETWORK

INCORPORATION BY REFERENCE

U.S. patent application Ser. No. 09/065,118, filed Apr. 23, 1998, in the name of Maria C. Gutierrez, et al., and entitled "System And Method For Regulating Message Flow In A Digital Data Network" (hereinafter referred to as the "Gutierrez, et al., patent application), assigned to the assignee of the instant application, incorporated by reference.

U.S. patent application Ser. No. 09/065,115, filed Apr. 23, 1998, in the name of Shawn A. Clayton, et al., and entitled "System And Method For Scheduling Message Transmission And Processing In A Digital Data Network" (hereinafter referred to as the "Clayton, et al., patent application), assigned to the assignee of the instant application, incorporated by reference.

FIELD OF THE INVENTION

The invention relates generally to the field of digital communications systems and more particularly to digital networks for facilitating communication of digital data in, for example, digital image, audio and video distribution systems and among digital computer systems. The invention more specifically provides a system and method for transferring information representative of conditions at a receiving device for a virtual circuit in a computer network.

BACKGROUND OF THE INVENTION

Digital networks have been developed to facilitate the transfer of information, including data and programs, among digital computer systems and other digital devices. Typically in a network, the information is transferred for applications by means of protocol stacks each including a plurality layers which provide various types of services, including, for transmitting information, adding error detection and/or correction information to facilitate detection and/or correction of errors in the information transfer process, dividing the information into manageable blocks and adding block sequencing information, adding addressing and virtual circuit information to identify a destination device and application that is to receive the information and to facilitate transferring of the blocks through the network, and transforming the digital information into electrical or optical signals for transmission over the network. For receiving information, the protocol stacks perform the services in reverse, including, for example, transforming the electrical and/or optical signals into digital information, determining from the addressing information the application that is to receive the information, using the block sequencing information to aggregate the blocks into information to be provided to the application, and using the error detection and/or correction information to determine whether the information was correctly transferred.

One problem that has arisen in connection with transfer of information through a network is that many of the operations performed by the protocol stack are initiated by calls by the application transferring the information to services provided by other programs, which can provide a significant amount of overhead. To alleviate this, an architecture, described in the Virtual Interface Architecture ("VIA") specification, Version 1 (Dec. 16, 1997), published by Compaq Computer Corp., Intel Corp. and Microsoft Corp., has been proposed which essentially makes the network interface available to the application. The application itself may need to perform at least some of the operations otherwise performed by various layers in prior protocol stacks, but those can be performed without the need to calling other programs, with the accompanying overhead. However, a problem arises in connection with the architecture described in the VIA specification, namely, it does not provide a mechanism by which devices may notify each other of various conditions in connection with transfer of information therebetween, and in particular does not provide a mechanism whereby a device that is to receive a message can notify the device transmitting the message that the message was incorrectly transferred or not received over the virtual circuit, or a mechanism whereby a device can notify another device that it is in condition to receive information from the other device over a particular virtual circuit.

SUMMARY OF THE INVENTION

The invention provides a new and improved system and method for transferring information representative of conditions at a receiving device for a virtual circuit in a computer network.

In brief summary, the invention provides a system comprising a plurality of devices which communicate over a network. At least one of the devices transmits information to at least one other of the devices in information messages over a virtual circuit established therebetween using the network. The other device can transmit information concerning, for example, predetermined conditions in the other device in connection with the virtual circuit using signalling messages, which are transmitted by the other device over the virtual circuit to the one device. The one device includes a plurality of mailboxes associated with the virtual circuit, and the other device, that is, the device that is to transmit signalling messages, includes a transmit signal queue including a plurality of entries each associated with one of the mailboxes. A processor on the other device, to enable transmission of a signalling message including the condition information to be transferred to a mailbox, loads the condition information to be transferred into the transmit signal queue entry associated with the mailbox. The other device, in turn, transmits the signalling message to the one device, which loads the condition information in the appropriate mailbox. A processor on the one device retrieves the condition information from the mailbox to determine the condition information as communicated thereto by the other device.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
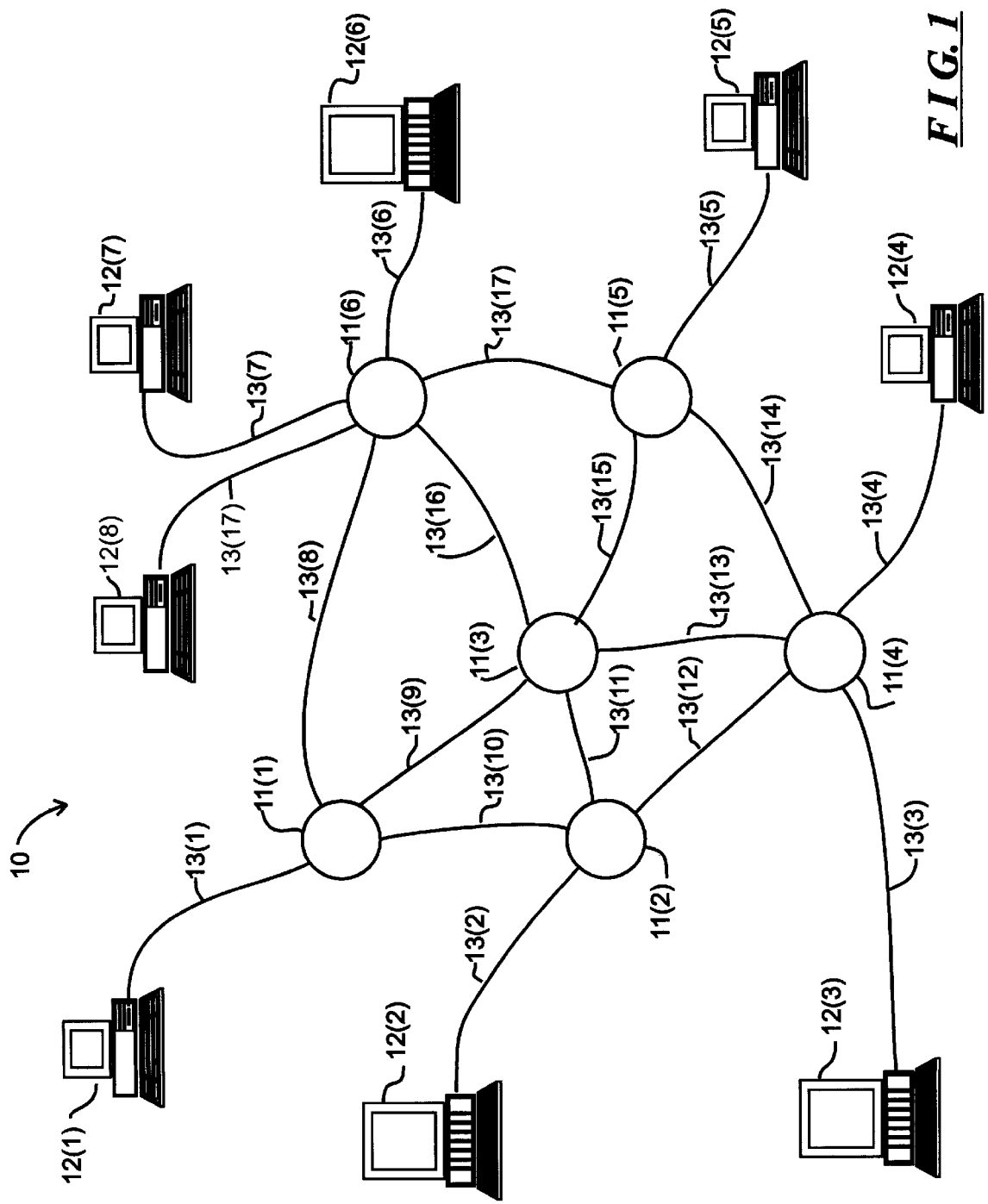
FIG. 1 schematically depicts a computer network implementing a system and method for transferring information representative of conditions at a receiving device for a virtual circuit, in accordance with the invention.

FIG. 1 schematically depicts a network 10 including a plurality of switching nodes 11(1) through 11(N) (generally identified by reference numeral 11(n)) for transferring signals representing data among a number of devices, which in FIG. 1 are represented by computers 12(1) through 12(M) (generally identified by reference numeral 12(m)). The computers 12(m), as is conventional, process data, in accordance with their program instructions to generate processed data. In their processing, a computer 12($m_s$) (subscript "S" referencing "source") may, as a source computer, need to transfer data, processed data and/or program instructions (all of which will be referred to herein generally as "information") to another, destination, computer 12($m_D$) (subscript "D" referencing "destination"), which may need to use the transferred information in its operations. Generally, computers 12(m) may comprise any type of conventional computer, including a conventional personal computer or computer workstation, server computer, mini- or mainframe computer, or the like. Each computer 12(m) is connected over a communication link, generally identified by reference numeral 13(p), to a switching node 11(n) to facilitate transmission of data thereto or the reception of data therefrom. The switching nodes 11(n) receive, buffer and forward data received from the computers 11(n) and from other switching nodes 11(n) to facilitate the transfer of data among the computers 12(m). The switching nodes 11(n) are interconnected by communication links, also generally identified by reference numeral 13(p) to facilitate the transfer of data thereamong. The communication links 13(p) may utilize any convenient data transmission medium. Each communication link 13(p) depicted in FIG. 1 is preferably bi-directional, allowing the switching nodes 11(n) to transmit and receive signals among each other and with computers 12(m) connected thereto over the same link; to accommodate bi-directional communication links, separate media may be provided for each communication link 13(p), each of which facilitates unidirectional transfer of signals thereover.

In one embodiment, the data is transferred using the well-known "ATM" ("Asynchronous Transfer Mode") transfer methodology. That methodology is described in detail in C. Partridge, Gigabit Networking, (Reading MA: Addison Wesley Publishing Company, 1994), primarily in chapters 3 and 4, and D. McDysan, et al., ATM Theory And Application (McGraw Hill, 1995) and will not be described in detail. Generally, in the ATM methodology, the computers 12(m) and the switching nodes 11(n) transmit data in the form of fixed-length "cells" over "virtual circuits" established between computers 12(m) through the network. Each virtual circuit essentially defines a path from a source computer 12($m_s$) to a destination computer 12($m_D$) through one or more switching nodes 11(n) and over respective communication links 13(p). In the ATM data transfer methodology, for a block of information to be transferred from a source computer 12($m_s$) to a destination computer 12($m_D$) over a virtual circuit established therebetween, the source computer 12($m_s$) allocates the data block to one or a series of "cells" for transmission serially over the communication link 13(p). Each cell transferred through the network 10 includes a header portion and a data portion, with the header portion including virtual circuit identifier information for controlling the transfer of the cell through the network 10, along with protocol and other control information, including an "end of message" ("EOM") flag. The data portion contains data from the data block that is to be transferred in the cell. The data portion of each cell is of fixed, predetermined length, which, in one embodiment, is forty-eight bytes. The source computer 12($m_s$) will pad the data in the data portion of the cell (if one cell will accommodate the data block to be transferred) or the last cell in the series (if multiple cells are required to accommodate the data block to be transferred) if the amount of data in the block is not an integral multiple of the size of the data portion of each cell to ensure that the data portion of the last cell has the required length. If a series of cells are required to transfer a data block, the source computer 12($m_s$) will transmit the cells so that the data in the data portions of the series of cells to conform to the order of data in the data block that is being transferred. In addition, if that cells are properly transferred to the destination computer 12($m_D$), the destination computer will receive the cells in the same order. In the last cell in a series which contains information from a data block, the end of message flag in the header portion is set, thereby to notify the destination computer 12($m_D$) that it has received all of the cells containing data for the data block.

Figure 2:
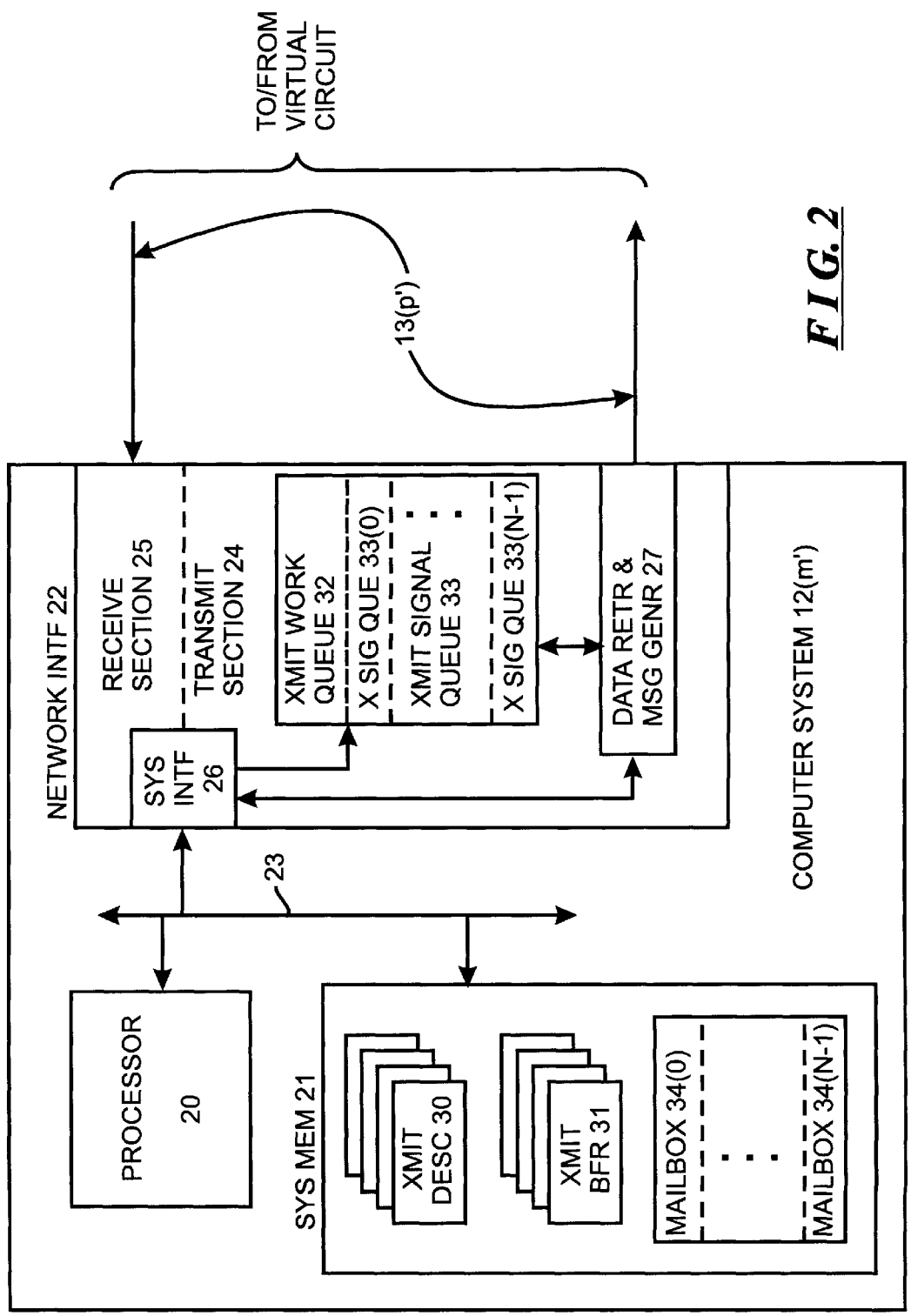
FIGS. 2 and 3 are functional block diagrams of computers used in the computer network depicted in FIG. 1.
Figure 3:
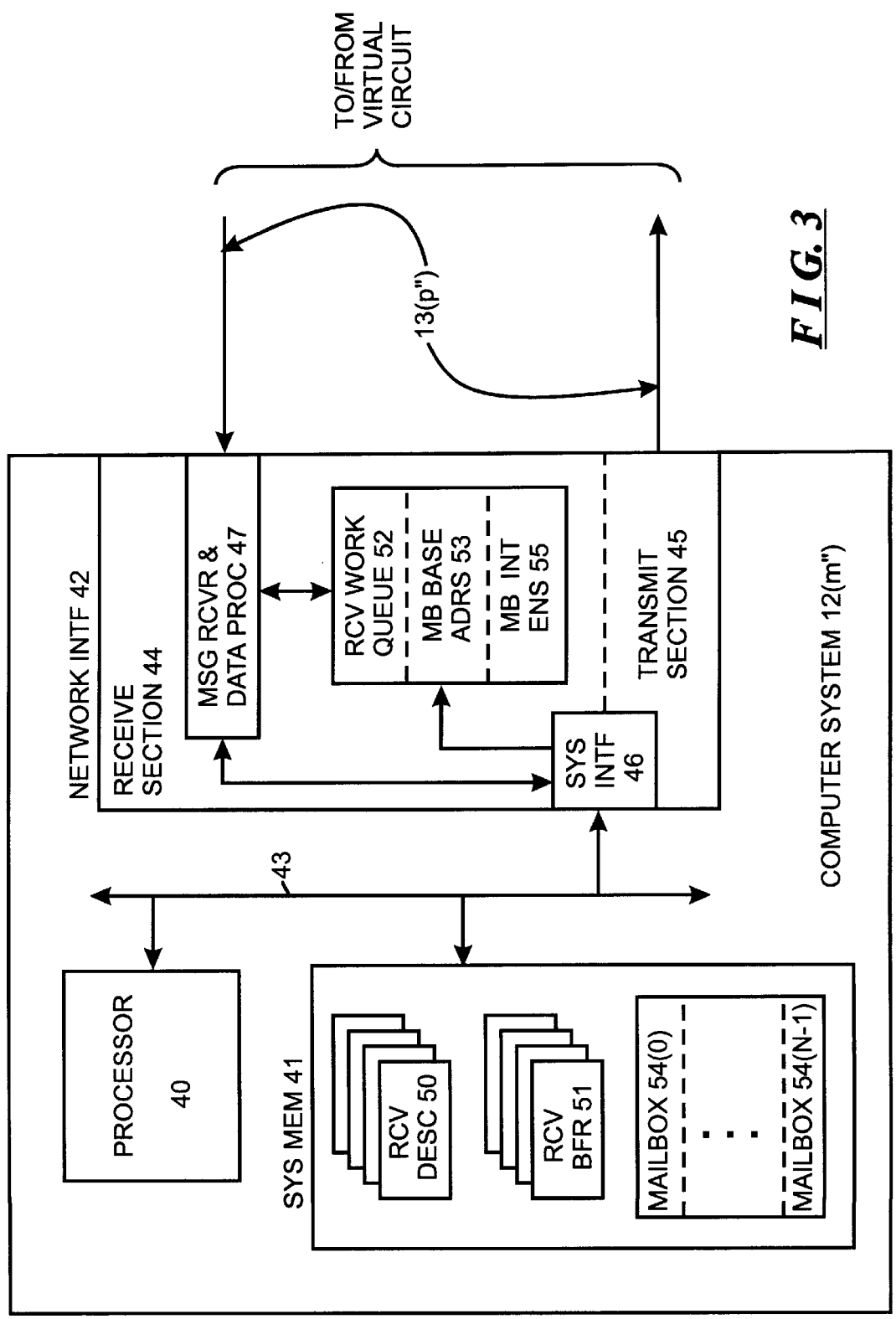

The invention provides an arrangement for enabling each computer 12(m) to notify respective ones of the other computers with which it communicates over a virtual circuit, of selected conditions with respect to the transfer of information over the respective virtual circuits therebetween. Before proceeding to a detailed description of the signalling arrangement used in network 10, it would be helpful to describe the structure and operation of two computers 12(m') and 12(m''), which generate and transmit messages over one or more virtual circuit(s) established therebetween. The virtual circuits established over the network are generally bidirectional, that is, each computer 12(m') and 12(m'') can transmit and receive messages over each virtual circuit established therebetween. FIGS. 2 and 3 depict functional block diagrams of the computers 12(m') and 12(m''). More specifically, FIG. 2 depicts a functional block diagram of computer 12(m') depicting in detail elements which transmit information over the virtual circuits for which computer 12(m') is a source computer, and FIG. 3 depicts a functional block diagram of computer 12(m'') depicting in detail elements which receive information over virtual circuits for which computer 12(m'') is a destination computer.

With reference to FIG. 2, computer 12(m') includes a processor 20, system memory 21, and a network interface 22 all interconnected by an interconnection arrangement 23. In one embodiment, the interconnection arrangement 23 includes a conventional PCI bus. The computer 12(m') may also include conventional mass storage subsystem(s) (not shown) connected to the interconnection arrangement 23, which generally provide long-term storage for information which may be processed by the processor 20. The mass storage subsystem(s) may include such devices as disk or tape subsystems, optical disk storage devices and CD-ROM devices in which information may be stored and/or from which information may be retrieved. The mass storage subsystem(s) may utilize removable storage media which may be removed and installed by an operator, which may allow the operator to load programs and data into the computer 12(m') and obtain processed data therefrom.

The computer 12(m') may also include conventional input/output subsystem(s) (not shown) connected to the interconnection arrangement 23, including operator input and output subsystems that generally provide an operator interface to the computer 12(m'). In particular, operator input subsystem(s) may include, for example, keyboard and mouse devices, which an operator may use to interactively input information to the computer 12(m') for processing. In addition, the operator input subsystems may provide mechanisms whereby the operator may control the computer 12(m'). The operator output subsystems may include devices such as video display devices, through which the computer 12(m') under control of the processor 20, displays results of processing to the operator. In addition, a printer may be provided to provide a hardcopy output for the operator.

The network interface 22 retrieves data from the system memory 21 that is to be transferred to other computers operating as destination computers 12(m'), generates cells therefrom and transfers the generated cells over the communication link 13(p'), which forms one of the communication links 13(p) described above in connection with FIG. 1, connected thereto. In addition, the network interface 22 receives cells from the communication link 13(p'), which forms one of the communication links 13(p) described above in connection with FIG. 1, extracts the data therefrom and transfers the data to appropriate buffers in the system memory 21 for storage. The network interface 22 includes a number of components, including a transmit section 24, a receive section 25, and a system interface circuit 26. The transmit section 24 is shown in detail in FIG. 2. The transmit section 24 cooperates with the system interface circuit 26 to retrieve data to be transmitted from the system memory 21 over interconnection arrangement 23, generates cells and transmits them over the communication link 13(p). The receive section 25 connects to the communication link 13(p') and receives cells received thereover, buffers the data from the received cells, and cooperates with the system interface circuit 26 to transfer the buffered data over interconnection arrangement 23 to the system memory 21 for storage. In one embodiment, the receive section 25 used in computer 12(m) is similar to that used in the computer 12(m''), which will be described below in connection with FIG. 3. In one embodiment, the system interface circuit 26 operates in a DMA (direct memory access) manner to retrieve data from the system memory 21 for transmission by the transmit section 24, and to transfer data received by the receive section 25 to the system memory 21 for storage. The system interface circuit 23 also operates to receive control information from the processor 20 for storage in various control registers which control operations of the transmit section 24 and receive section 25, as well as of the system interface circuit 26 itself. A detailed description of a network interface 24 used in one embodiment of the invention is described in the aforementioned Gutierrez, et al., and Clayton, et al., patent applications.

The processor 20 processes one or more application programs under control of an operating system. In specific connection with transfers of data over the network 10, for transfers in which the computer 12(m') operates as a source computer 12(m'$_s$) for transmitting messages over a virtual circuit, the processor 20 can establish one or more descriptors 30 associated with the virtual circuit, each of which identifies one or more transmit data buffers 31 in the system memory 21 in which it loads blocks of data to be transferred to the computer 12(m'') as described, for one embodiment, in the Virtual Interface Architecture ("VIA") specification, Version 1 (Dec. 16, 1997), published by Compaq Computer Corp., Intel Corp. and Microsoft Corp. In addition, to notify the network interface 22 that a descriptor 30 has been loaded into the system memory 21 for a virtual circuit, the processor 20, using a "doorbell" notification mechanism provided for the virtual circuit, loads information for the descriptor, including a pointer thereto identifying the location for the descriptor in system memory 21, into a transmit work queue 32 maintained for the virtual circuit in the transmit section 24. As described in the aforementioned Gutierrez, et al., and Clayton, et al., patent applications, the computer 12(m') can transmit data using a plurality of virtual circuits, one or more of which may be established between it and computer 12(m''), and the transmit section 24 will provide a transmit work queue 32 for each virtual circuit. Each work queue 32, in turn, may include pointer information for zero or more descriptors (the work queue may include pointers to zero descriptors if the computer 12(m'') has no data to transmit over the virtual circuit), with all of the descriptors that are pointed to by the pointer information in the work queue 32.

The transmit section 24, in addition to the work queue 32, includes a data retrieval and message generator circuit 27. The data retrieval and message generator circuit 27 uses the descriptor pointer information in the transmit work queue 32 to identify transmit descriptors 30 which the processor 20 has stored in system memory 21 for the respective virtual circuits. The data retrieval and message generator circuit 27, in turn, enable the system interface 26 to retrieve the descriptor information from the transmit descriptors 30. Using the pointers to the transmit data buffers 31 as contained in the transmit descriptors 30, the data retrieval and message generator circuit 27 enables the system interface 26 to retrieve data to be transmitted from the respective transmit buffers 31. The data retrieval and message generator circuit 27 receives the data retrieved by the system interface 26, generates ATM cells therefrom and transmits them over the communication link 13(p) connected thereto, thereby to effect transmission thereover over the respective virtual circuits for which computer 12(m') is a source computer. Operations performed by the data retrieval and message generator circuit 27 in connection with scheduling of retrieval of data and transmission of cells for the various virtual circuits for one embodiment of the invention are described in the aforementioned Gutierrez, et al., and Clayton, et al., patent applications.

The computer 12(m') also includes, associated with each virtual circuit over which it transmits and/or receives messages, a transmit signal queue 33 and a set of "N" mailboxes 34(0) through 34(N-1) (generally identified by reference numeral 34(n)) in the system memory 21, whose purpose will be described below. The transmit signal queue 33 includes "N" entries 33(0) through 33(N-1) (generally identified by reference numeral 33(n)) each associated with a mailbox.

A functional block diagram of the computer 12(''m), which transmits and receives information over one or more virtual circuits over which computer 12(m'') transmits information, is depicted in FIG. 3. With reference to FIG. 3, computer 12(m'') includes a processor 40, system memory 41, and a network interface 42 all interconnected by an interconnection arrangement 43. In one embodiment, the interconnection arrangement 43 includes a conventional PCI bus. The computer 12(m'') may also include conventional mass storage subsystem(s) (not shown) connected to the interconnection arrangement 43, which generally provide long-term storage for information which may be processed by the processor 40. The mass storage subsystem(s) may include such devices as disk or tape subsystems, optical disk storage devices and CD-ROM devices in which information may be stored and/or from which information may be retrieved. The mass storage subsystem(s) may utilize removable storage media which may be removed and installed by an operator, which may allow the operator to load programs and data into the computer 12(m'') and obtain processed data therefrom.

The computer 12(m'') may also include conventional input/output subsystem(s) (not shown) connected to the interconnection arrangement 43, including operator input and output subsystems that generally provide an operator interface to the computer 12(m''). In particular, operator input subsystem(s) may include, for example, keyboard and mouse devices, which an operator may use to interactively input information to the computer 12(*m"*) for processing. In addition, the operator input subsystems may provide mechanisms whereby the operator may control the computer 12(*m"*). The operator output subsystems may include devices such as video display devices, through which the computer 12(*m"*) under control of the processor 40, displays results of processing to the operator. In addition, a printer may be provided to provide a hardcopy output for the operator.

The network interface 42 retrieves data from the system memory 41 that is to be transferred to other computers operating as destination computers 12(*m"*$_D$), generates cells therefrom and transfers the generated cells over the communication link 13(*p"*), which forms one of the communication links 13(*p*) described above in connection with FIG. 1, connected thereto. In addition, the network interface 42 receives cells from the communication link 13(*p"*), extracts the data therefrom and transfers the data to appropriate buffers in the system memory 41 for storage. The network interface 42 includes a number of components, including a receive section 44, a transmit section 45, and a system interface circuit 46. In one embodiment, the transmit section 45 is similar to the transmit section 24 described above in connection with FIG. 2. The transmit section 45 cooperates with the system interface circuit 46 to retrieve data to be transmitted from the system memory 41 over interconnection arrangement 43, generates cells and transmits them over the communication link 13(*p"*). The receive section 44 connects to the communication link 13(*p"*) and receives cells received thereover, buffers the data from the received cells, and cooperates with the system interface circuit 46 to transfer the buffered data over interconnection arrangement 43 to the system memory 41 for storage. In one embodiment, the system interface circuit 46 operates in a DMA (direct memory access) manner to retrieve data from the system memory 41 for transmission by the transmit section 45, and to transfer data received by the receive section 44 to the system memory 41 for storage. The system interface circuit 43 also operates to receive control information from the processor 40 for storage in various control registers which control operations of the transmit section 45 and receive section 44, as well as of the system interface circuit 46 itself. A detailed description of a network interface 45 used in one embodiment of the invention is described in the aforementioned Gutierrez, et al., and Clayton, et al., patent applications.

The processor 40 processes one or more application programs under control of an operating system. In specific connection with transfers of data over the network 10, for transfers in which the computer 12(*m"*) operates as a destination computer for receiving messages over a virtual circuit, the processor 40 can establish one or more receive descriptors 50 associated with the virtual circuit, each of which identifies one or more receive data buffers 51 in the system memory 41 in which data from messages received by the receive section 44 over the virtual circuit is to be loaded as described, for one embodiment, in the above-referenced VIA specification. In addition, to notify the network interface 42 that a receive descriptor 50 has been loaded into the system memory 41 for a virtual circuit, the processor 40, using a "doorbell" notification mechanism provided for the virtual circuit, loads information for the descriptor, including a pointer thereto identifying the location for the descriptor in system memory 41, into a receive work queue 52 maintained for the virtual circuit in the receive section 44. As described in the aforementioned Gutierrez, et al., and Clayton, et al., patent applications, the computer 12(*m"*) can receive data using a plurality of virtual circuits, one or more of which may be established between it and computer 12(*m"*), and the receive section 44 will provide a receive work queue 52 for each virtual circuit. Each receive work queue 52, in turn, may include pointer information for zero or more descriptors, with all of the receive descriptors that are pointed to by the pointer information in the receive work queue 52.

The receive section 44, in addition to the receive work queue 52, includes a message receiver and data processor circuit 47. The message receiver and data processor circuit receives cells associated with the various virtual circuits for which the computer 12(*m"*) is a destination computer and extracts the data therefrom. The message receiver and data processor circuit 47 also uses the descriptor pointer information in the receive work queue 52 to identify receive descriptors 50 which the processor 40 has stored in system memory 41 for the respective virtual circuits. The message receiver and data processor circuit 47, in turn, enables the system interface 46 to retrieve the descriptor information from the receive descriptors 50. Using the pointers to the receive data buffers 51 as contained in the receive descriptors 50, the message receiver and data processor circuit 47 enables the system interface 46 to transfer the received data to the respective receive buffers 51. Operations performed by the message receiver and data processor circuit 47 in connection with scheduling of the transfer of data for the various virtual circuits for one embodiment of the invention are described in the aforementioned Gutierrez, et al., and Clayton, et al., patent applications.

The computer 12(*m"*) also includes, associated with each virtual circuit over which it transmits and/or receives messages, a set of "N" mailboxes 54(0) through 54(N-1) (generally identified by reference numeral 54(*n*)) in the system memory 41, a mailbox base address pointer 53, which points to mailbox 54(0), and a set of mailbox interrupt enable flags 55, with each mailbox interrupt enable flag being associated with one of the mailboxes 54(*n*). Each of the mailboxes 54(*n*) provided by computer 12(*m"*) is associated with the correspondingly-indexed transmit signal queue entry 33(*n*) provided by the computer 12(*m'*). As noted above, in one embodiment the transmit section 45 of the computer 12(*m"*) is similar to the transmit section 24 of the computer 12(*m'*) and so the transmit section 45 of computer 12(*m"*) also includes a transmit signal queue including a plurality of entries each associated with one of the mailboxes 34(*n*) provided by computer 12(*m'*). As further noted above, in one embodiment the receive section 25 of computer 12(*m'*) is similar to the receive section 44 of the computer 12(*m"*), and so the receive section 25 of computer 12(*m'*) also includes a mailbox base address pointer and a set of mailbox interrupt enable flags.

In accordance with the invention, the mailboxes 34(*n*), 54(*n*) and associated components (that is, the transmit signal queues, mailbox base address pointers and mailbox interrupt enable flags) provide a mechanism whereby each computer 12(*m'*), 12(*m"*), can provide the other computer 12(*m"*), 12(*m'*) with notification of selected conditions in connection with the transfer of messages over the respective virtual circuit. For example, the mailboxes 34(*n*), 54(*n*) and associated components provide a mechanism whereby each computer 12(*m'*), 12(*m"*) can notify the other computer 12(*m"*), 12(*m'*) when it (that is, the computer 12(*m'*), 12(*m"*)) provides one or more additional receive buffers 51 to accommodate data for transmission by the other computer 12(*m"*), 12(*m'*) over the virtual circuit. In addition, the mailboxes 34(n), 54(n) and associated components provide a mechanism whereby each computer 12(m'), 12(m'') can acknowledge receipt of messages transmitted by the other computer 12(m''), 12(m') over the virtual circuit. Other conditions which can be accommodated using the mailboxes 34(n), 54(n) and associated components will be apparent to those skilled in the art.

To accomplish this, each computer can provide a notification of a selected condition to the other computer by transmitting a message over the virtual circuit, identified herein as a signalling message, which identifies one of the mailboxes, which is associated with the condition, and includes data to be loaded into the identified mailbox. Thus, if computer 12(m') wishes to provide a notification to the other computer 12(m'') that it has provided one or more additional receive buffers, it can generate a signalling message including the identification of a mailbox 54(n) associated with the particular condition (that is, the addition of receive buffers), and including information as to the number or size of additional buffers, and transmit the signalling message to the computer 12(m'') over the virtual circuit. The processor 20 of computer 12(m') will enable the data retriever and message generator 27 to generate and transmit a signalling message by loading a signal message transmit enable notification in the transmit signal queue 33 in the transmit section 24 that is associated with the virtual circuit, the signal message transmit enable notification including the information to be transmitted in the signalling message and the identification of the mailbox 54(n) into which the information is to be loaded.

In particular, to enable generation of a signalling message for mailbox 54(n) of computer 12(m''), the processor 20 of computer 12(m') will load the signal message transmit enable notification in the correspondingly-indexed entry 33(n) of the transmit signal queue 33 of its (that is, computer 12(m')'s) transmit section 24. In one embodiment, the information and mailbox identification can be accommodated in a single ATM cell. The data retriever and message generator 27 will retrieve the signal message transmit enable notification and in response thereto generate the signalling message and transmit it over the virtual circuit. Further in one embodiment, if an entry 33(n) of the transmit signal queue associated with a virtual circuit contains a signal message transmit enable notification enabling transmission of a signalling message for the virtual circuit, the data retriever and message generator 27 will generally generate and transmit a signal message for that notification prior to processing the descriptor pointer information for the virtual circuit in the transmit work queue 32; thus, for each virtual circuit, the signalling messages to be transmitted for the virtual circuit generally have a higher scheduling priority than other messages that are transmitted for the virtual circuit.

The computer 12(m''), in particular its message receiver and data processor 47, will receive the signalling message, identify from the mailbox identification in the message the particular mailbox 54(n) into which the information in the message is to be stored, and enable the system interface 46 to store the information in the mailbox 54(n) in system memory 21. The mailbox identification in the signalling message is in the form of an offset into the mailboxes associated with the virtual circuit, and the message receiver and data processor 47 uses the mailbox base address pointer 53 and the offset to identify the particular location in system memory 41 comprising the identified mailbox 54(n). In addition, if a mailbox interrupt enable flag, in the mailbox interrupt enable flags 54, is set, the message receiver and data processor 47 will enable the system interface 46 to interrupt the processor 40 to notify it (that is, the processor) that information has been loaded into the mailbox 54(n). The processor 40 can perform predetermined operations in response to the interrupt notification, including, for example, notifying an application program being processed thereby of the additional buffers provided by the computer 12(m') for receipt of data over the virtual circuit; in response, the application program can, for example, provide additional data to be transmitted to the computer 12(m') in respective transmit buffers, and also provide additional transmit descriptors as may be necessary therefor.

It will be appreciated that corresponding operations may be performed by the computer 12(m'') and computer 12(m') in connection with the generation, transfer and reception of signalling messages transmitted by the computer 12(m'') to the computer 12(m'). In addition, it will be appreciated that the specific operations performed by the particular computer 12(m'), 12(m'') in connection with information received in signalling messages will depend on the specific conditions associated with the respective mailboxes in which the information is loaded. For example, for a mailbox used to provide notification of acknowledgment or negative-acknowledgment of the receipt of messages, if the information loaded into the mailbox indicates that a message has not been properly received, either because the message did not reach the destination computer or because the data in the message was incorrectly transferred, the computer 12(m'), 12(m'') which receives such a notification may re-transmit the improperly received message.

The invention provides a number of advantages. In particular, it provides an arrangement whereby each computer which receives messages over a particular virtual circuit notify the computer transmitting the messages of selected conditions in connection with transmission of messages over the virtual circuit.

In addition, it will be appreciated that, by providing the transmit signal queues 33 for the various virtual circuits in the transmit sections 24,44 of the respective network interfaces 22, 42, the data retrieval and message generator circuits will not need to retrieve information from the respective system memories 21, 41, when they are to transmit signalling messages. This reduces the number of memory accesses required to be performed by the network interfaces 22, 42, and allows for faster and more efficient processing and transmission of signalling messages.

It will be appreciated that a number of modifications may be made to the network 10 and computers 12(m) as described above. For example, it will be appreciated that a network 10 in connection with the invention may be constructed by interconnecting a plurality of computers 12(m) without the need of switching nodes 11(n), for example, by interconnecting the network interfaces 22, 42 of two computers 12(m), and allowing them to establish virtual circuits for transferring data therebetween. In addition, it will be appreciated that other types of components, such as gateways, bridges, and the like, may be provided for connecting the network 10 to other networks, and other types of devices, such as mass storage systems, may be connected to the network as sources and/or destinations of messages in a manner similar to that described above in connection with the computers 12(m). Furthermore, the computers 12(m'), 12(m'') may make use of network interfaces different from those described in the aforementioned Gutierrez, et al., and Clayton, et al., patent applications.

Furthermore, although the computers 12(m'), 12(m'') have been described as providing one entry 33(n) in the transmit signal queue 33 associated with the correspondingly-indexed mailbox 54(n) provided for each virtual circuit, it will be appreciated that the computers may instead provide a plurality of such entries 33(n)(1), . . . ,33(n)(M) (generally identified by reference numeral 33(n)(m)) all of which are associated with the mailbox 54(n), and which can receive information to be transferred to that mailbox 54(n) using any convenient scheduling methodology. In the embodiment in which one entry 33(n) is provided associated with mailbox 54(n), if the processor 20 wishes to transmit updated condition information to a mailbox 54(n) before the transmit section 24 has transmitted the previously-provided condition information, the processor 20 need only overwrite the information in the associated entry 33(n) in the transmit signal queue 33 with the updated condition information. In that case, when the transmit section 24 transmits the updated condition information in a signalling message, the information delivered to the mailbox 54(n) will comprise the information that would be received by the processor 40 if the mailbox 54(n) had been loaded with condition information from two signalling messages, including the previously-provided condition information and the subsequently-provided condition information, before the processor 40 had been able to retrieve the previously-provided condition information. This serves to simplify the mechanisms provided in the network interface 22, 42 for transferring condition information using signalling messages and in addition can reduce the number of signalling messages from that which might be required if a signalling message were required for each item of condition information provided by the processors 20, 40.

In addition, although the invention has been described as making use of a transmit signal queue 33 to provide information for use in signalling messages, it will be described that information for use in signalling messages may instead, or in addition, be provided in transmit data buffers 31, pointed to by transmit descriptors 30, in a manner similar to that used in transfers of data generally over the respective virtual circuit. In that case, the respective transmit descriptor 30 will identify the information in the transmit data buffer 31 as being for a mailbox in the computer to receive the information. The particular mailbox into which the information is to be loaded may also be identified in the descriptor, or in the data contained in the transmit data buffer(s).

In addition, although the invention has been described in connection with the transfer of data using ATM cells, it will be appreciated that other data transfer methodologies may be used.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system comprising at least two devices which communicate over a digital network, one of said devices transmitting information in the form of information messages to another of said devices over a virtual circuit established therebetween over said network, A. said one of said devices including:
      i. a plurality of mailboxes associated with said virtual circuit;
      ii. a signalling message receiver configured to receive a signal message over said virtual circuit and load signalling information into one of said mailboxes as identified by said signalling message; and
      iii. a signalling information processor configured to retrieve said signalling information from said one of said mailboxes and perform predetermined processing operations in connection therewith; and
   B. said other of said devices including
      i. a transmit signal queue associated with the virtual circuit, the transmit signal queue including a plurality of entries, each associated with one of said mailboxes, each entry being configured to receive signalling information to be transmitted;
      ii. a signalling message transmitter configured to generate signalling messages from signalling information said transmit signal queue and transmit the generated signalling messages to the one of said devices over the virtual circuit; and
      iii. a signalling information generator configured to generate said signalling information and load it into the respective entry of said transmit signal queue.

2. A system as defined in claim 1 in which said one of said devices includes a system memory, the mailboxes residing in said system memory, the signalling information receiver further including a mailbox base address pointer identifying a base address for said plurality of mailboxes in the system memory.

3. A system as defined in claim 1 in which said one of said devices further includes at least one interrupt enable flag associated with one of said mailboxes, the signalling message receiver, when it loads signalling information into said one of said mailboxes, generating an interrupt to interrupt said signalling information processor.

* * * * *